United States Patent
Alexander et al.

(10) Patent No.: US 6,212,191 B1
(45) Date of Patent: Apr. 3, 2001

(54) METHOD AND SYSTEM FOR PROVIDING SECURITY TO ASYNCHRONOUS TRANSFER MODE EMULATED LOCAL-AREA NETWORKS

(75) Inventors: Cedell A. Alexander, Durham; Matthew B. Squire, Raleigh, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/017,308

(22) Filed: Jan. 30, 1998

Related U.S. Application Data

(60) Provisional application No. 60/036,609, filed on Jan. 30, 1997.

(51) Int. Cl.[7] .......................... G01R 31/08; H04L 12/26; H04L 12/28; G06F 15/177; G06F 15/16
(52) U.S. Cl. ...................... 370/401; 370/216; 370/217; 370/396; 370/409; 395/200.5; 395/200.53; 709/220; 709/223; 709/249
(58) Field of Search ................................... 370/396, 401, 370/404, 257, 469, 395, 387, 216, 217; 709/229, 203, 216; 395/200.5, 200.53

(56) References Cited

U.S. PATENT DOCUMENTS

| | | |
|---|---|---|
| 5,446,726 | 8/1995 | Rostoker et al. . |
| 5,461,627 | 10/1995 | Rypinski . |
| 5,526,349 | 6/1996 | Diaz et al. . |
| 5,581,552 | 12/1996 | Civanlar et al. . |
| 5,600,644 | 2/1997 | Chang et al. . |
| 5,708,654 * | 1/1998 | Arndt et al. ........................ 370/242 |
| 5,805,805 * | 9/1998 | Civanlar et al. ................... 395/200.5 |
| 5,812,552 * | 9/1998 | Arora et al. ......................... 370/401 |
| 5,835,481 * | 11/1998 | Akyol et al. ........................ 370/216 |
| 5,974,452 * | 10/1999 | Karapetkov et al. ............... 709/218 |

OTHER PUBLICATIONS

Bill Ellington et al., "Implementing ATM Forum–Compliant LAN Emulation," IBM Corporation, Digital Communications Design Conference, 1996.

* cited by examiner

*Primary Examiner*—Huy D. Vy
*Assistant Examiner*—M. Phan
(74) *Attorney, Agent, or Firm*—Andrew J. Dillon; Felsman, Bradley, Vaden Gunther & Dillon

(57) ABSTRACT

A method for providing a security mechanism to an Asynchronous Transfer Mode (ATM) emulated local-area network (LAN) is disclosed. The ATM emulated LAN is served by a LAN Emulation Server (LES), a Broadcast and Unknown Server (BUS), and a LAN Emulation Configuration Server (LECS). After receiving a LE_JOIN_REQUEST from an LE client within the emulated LAN, the LES forms a LE_CONFIGURE_REQUEST on behalf of the LE client, by utilizing the information from the LE_JOIN_REQUEST. The LES then sends the LE_CONFIGURE_REQUEST to the LECS. In turn, the LECS sends back a LE_CONFIGURE_RESPONSE to the LES. After receiving the LE_CONFIGURE_RESPONSE from the LECS, a determination is made as to whether or not a status field within the LE_CONFIGURE_RESPONSE indicates a success and a target ATM address field within the LE_CONFIGURE_RESPONSE contains an ATM address of the LES. If both of the above-mentioned conditions are met, the LES then sends a LE_JOIN_RESPONSE with a success status back to the requesting LE client such that the requesting LE client is allowed to join the emulated LAN.

15 Claims, 4 Drawing Sheets

METHOD AND SYSTEM FOR PROVIDING SECURITY TO ASYNCHRONOUS TRANSFER MODE EMULATED LOCAL-AREA NETWORKS

This application claims benefit to U.S. provisional application No. 60/036,609, filed Jan. 30, 1997.

BACKGROUND OF THE INVENTION

1. Technical Field

The present invention relates to a method and system for data processing in general, and in particular to a method and system for providing security mechanism within a local-area network. Still more particularly, the present invention relates to a method and system for providing security mechanism to an Asynchronous Transfer Mode emulated local-area network.

2. Description of the Prior Art

For several years, the embedded base of many communication networks have been established according to the IEEE 802 Local-Area Network (LAN) standards, such as the IEEE 802.3 standard for Ethernet LANs and the IEEE 802.5 standard for Token-Ring LANs. These communication networks are considered to be "connectionless" because data packets can be exchanged within these networks without establishing a layer-2 connection under the seven-layer networking reference model established by the International Organization for Standardization (ISO). In addition, the applications within these communications networks typically reside on top of a layer-2 protocol and a layer-3 protocol, such as Medium Access Connection (MAC) and Internet Protocol (IP), respectively.

With the advent of Asynchronous Transfer Mode (ATM) technology, which offers the advantages of fixed-size cell switching, sealablility from a few megabits to hundreds of megabits, the ability to offer guaranteed quality of service on a per connection basis, etc., it is desirable to interconnect a LAN which is still under one of the IEEE 802 LAN standards (or so-called a Legacy LAN) with communication networks that are equipped with ATM capabilities. This type of interconnection has been achieved by a variety of methods, such as bridging-and-routing, that are well-known to those skilled in the art of communications network development. Generally speaking, all these methods provide acceptable results, but as a whole, there is ample room for improvement. For example, some of the methods are based on a broadcast principle that mimics shared-medium operations in which all data packets must be broadcast to all destinations. This method of packet broadcast ends up flooding the entire ATM network with broadcast traffic. Another problem associated with the broadcast principle is that it requires that a mesh of networks be established between all bridges and ATM hosts within a LAN and that all inter-LAN traffic pass through a router, which typically becomes the bottleneck of the LAN.

As a goal to provide a better ATM network solution, the ATM Forum has developed another bridging solution called LAN Emulation (LANE). LANE protocols allow ATM networks to provide the appearance of a LAN-like Ethernet or a LAN-like Token-Ring. A LANE architecture emulates traditional LAN technologies over a switched ATM network. Specifically, LANE relies on a LAN Emulation Server (LES) to perform ATM-to-MAC address translations, and a Broadcast and Unknown Server (BUS) to perform data broadcast. A more detailed description of the LANE technology can be found in *LAN Emulation Over ATM Specifications*, version 1.0, promulgated by the ATM Forum, the content of which is incorporated herein by reference.

One of the major issues in migrating Legacy LANs to ATM technology is system security. Legacy LANs offer intrinsic system security in the sense that a physical connection between two end systems implies that the two end systems are on the same LAN. With emulated LANs, any participating station is allowed to be assigned to an emulated LAN via an administrative procedure, which essentially decouples a physical end system and its connection from its membership in a particular emulated LAN. That means an end system may be physically moved but may still participate in the same emulated LAN. Thus, physical connectivity in emulated LANs no longer implies the same level of system security as in Legacy LANs. As a result, there is a risk of unauthorized computer systems connected to an emulated LAN and attempting to utilize services normally not authorized to these computer systems. In addition, since LE client usage of a LAN Emulation Configuration Server (LECS) is optional, reliance on the configuration protocol is not a viable security mechanism for an emulated LAN. Consequently, it would be desirable to provide a better security mechanism for an emulated LAN.

SUMMARY OF THE INVENTION

In view of the foregoing, it is therefore an object of the present invention to provide an improved method and system for data processing.

It is another object of the present invention to provide an improved method and system for providing a security mechanism within a local-area network.

It is yet another object of the present invention to provide an improved method and system for providing a security mechanism to an Asynchronous Transfer Mode emulated local-area network.

In accordance with a method and system of the present invention, an Asynchronous Transfer Mode (ATM) emulated local-area network (LAN) is served by a LAN Emulation Server (LES), a Broadcast and Unknown Server (BUS), and a LAN Emulation Configuration Server (LECS). After receiving a LE_JOIN_REQUEST from an LE client within the emulated LAN, the LES forms a LE_CONFIGURE_REQUEST on behalf of the LE client, by utilizing the information from the LE_JOIN_REQUEST. The LES then sends the LE_CONFIGURE_REQUEST to the LECS. In turn, the LECS sends back a LE_CONFIGURE_RESPONSE to the LES. After receiving the LE_CONFIGURE_RESPONSE from the LECS, a determination is made as to whether or not a status field within the LE_CONFIGURE_RESPONSE indicates a success and a target ATM address field within the LE_CONFIGURE_RESPONSE contains an ATM address of the LES. If both of the above-mentioned conditions are met, the LES then sends a LE_JOIN_RESPONSE with a success status back to the requesting LE client such that the requesting LE client is allowed to join the emulated LAN.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention is applicable to a variety of data networks such as a local-area network (LAN) or a wide-area network (WAN). The computers within the data networks may be personal computers, workstations, midrange computers, or mainframe computers.

Figure 1:
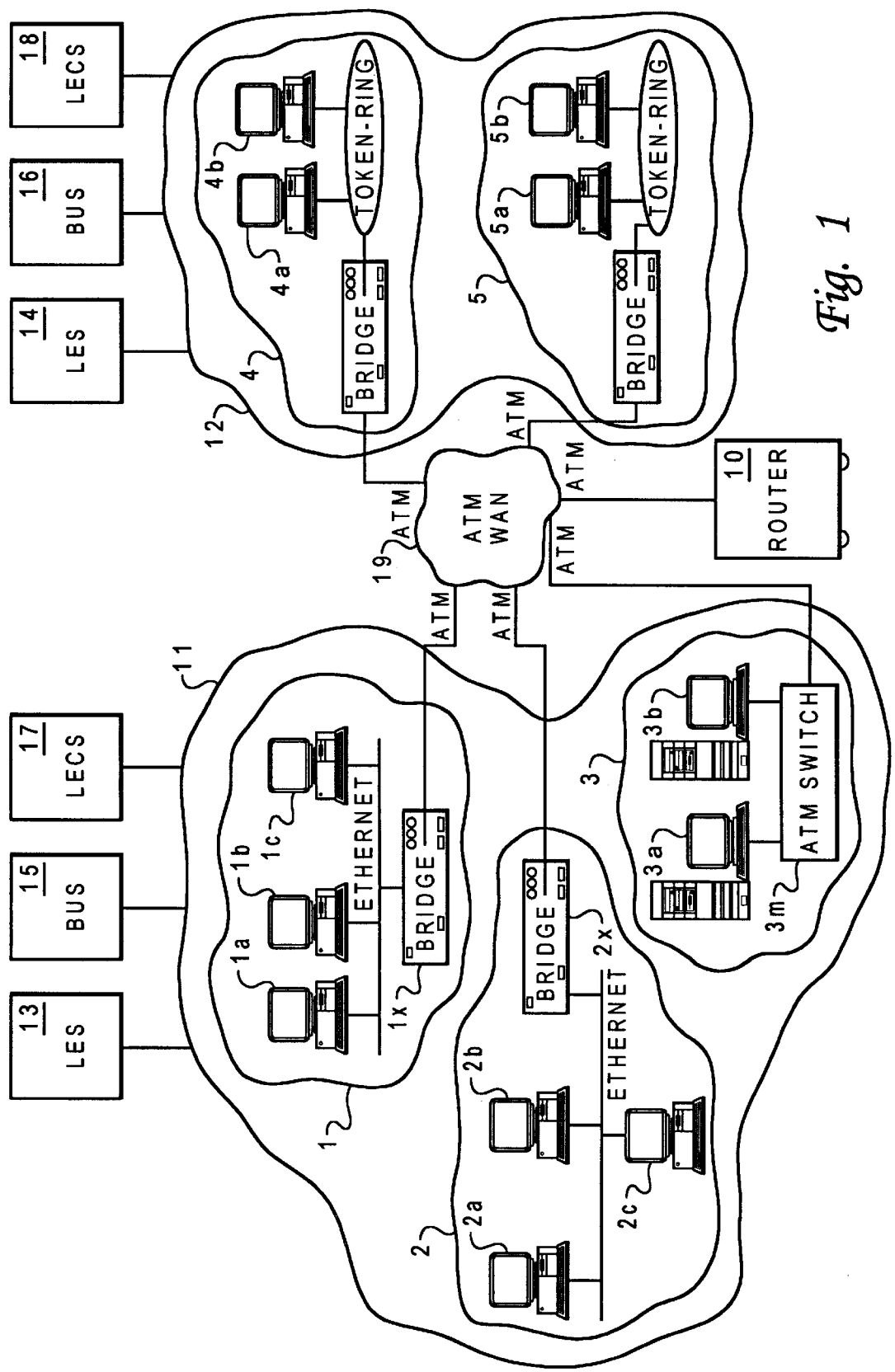
FIG. 1 is a graphical depiction of a LAN emulation architecture in which a preferred embodiment of the present invention may be incorporated.

Referring now to the drawings and in particular to FIG. 1, there is illustrated a pictorial depiction of a LAN emulation (LANE) architecture in which a preferred embodiment of the present invention may be incorporated. As shown, LAN 11 and LAN 12 are two separate emulated LANs. LAN 11, having sites 1, 2, and 3, is interconnected to LAN 12, having sites 4 and 5, via an Asynchronous Transfer Mode (ATM) WAN 19 that is coupled to a rater 10. Computers 1a, 1b, and 1c of site 1 may be interconnected to each other via an Ethernet, computers 2a, 2b, and 2c of site 2 may be interconnected to each other via another Ethernet, and workstations 3a and 3b of site 3 are connected to an ATM switch 3m. A similar arrangement is also depicted in LAN 12 having only two sites 4, 5. Computers 4a and 4b of site 4 may be interconnected to each other via a Token-Ring, and computers 5a and 5b of site 5 may be interconnected to each other via another Token-Ring.

LAN 11 is served by a LAN Emulated Server (LES) 13, a Broadcast and Unknown Server (BUS) 15, and a LAN Emulated Configuration Server (LECS) 17, while LAN 12 is served by a LES 14, a BUS 16, and a LECS 18. Because LES 13, BUS 15, and LECS 17 essentially provide similar functions to LAN 11 as LES 14, BUS 16, and LECS 18 provide to LAN 12, only LES 13, BUS 15, and LECS 17 will be further described. In order for LES 13 to provide control over LAN 11, a bi-directional connection must be established between a LAN emulated client (LE client) within LAN 11 and LES 13. Generally speaking, a LE client is a bridge or an end-station, for example, bridge 1x, that is directly connected to an ATM network. Once the LE client has obtained an LES address from LECS 17, the LE client then utilizes a join procedure to become a member of LAN 11. During the join procedure, the LE client identifies its address(es), requests membership in LAN 11, and conveys characteristics such as LAN type, proxy status, etc. After the LE client has joined and registered with LES 13, LES 13 can start to provide information such as ATM addresses and MAC addresses to the LE client. Also, LES 13 can utilize the registered information of the LE client to resolve MAC addresses to ATM addresses or to forward any resolution requests. BUS 15 provides a connectionless data forwarding function such as data broadcasting, multicasting, and unicasting to any registered LE client. The LE client is also responsible for setting up a bi-directional connection to BUS 15, over which BUS 15 sends broadcast and multicast traffic to the LE client.

If computer 1a transmits a data packet with a MAC address of computer 2b, all computers on the Ethernet and a bridge 1x within site 1 will also receive the data packet. Bridge 1x may contain the ATM address of computer 2b within its own database; if not, bridge 1x will transmit an LE_ARP_REQUEST message, as defined in the *LAN Emulation Over ATM Specification* (ATM Specification) referred above, to LES 13 in order to obtain the ATM address of computer 2b. If LES 13 contains the requested ATM address of computer 2b, LES 13 will respond by transmitting the requested ATM address of computer 2b to bridge 1x. After building an ATM connection with bridge 2x, bridge 1x then transmits the data packet to bridge 2x, without going through BUS 15. Otherwise, if LES 13 does not contain the requested ATM address of computer 2b, LES 13 will broadcast the LE_ARP_REQUEST message requesting the ATM address of computer 2b to all other LE clients within LAN 11, namely, bridge 2x, workstation 3a, and workstation 3b. Broadcast data packets, such as an IP ARP_REQUEST, are forwarded to BUS 15, which in turn broadcasts the data packets to all LE clients within LAN 11. Bridge 2x then responds to LES 13 with bridge 2x's own ATM address, because bridge 2x is serving computer 2b, the computer whose MAC address has been specified. According to the ATM Specification, bridge 2x is also known as a Proxy LE client because bridge 2x represents multiple end-point addresses, such as the MAC address of computers 2a, 2b, and 2c.

Figure 2:
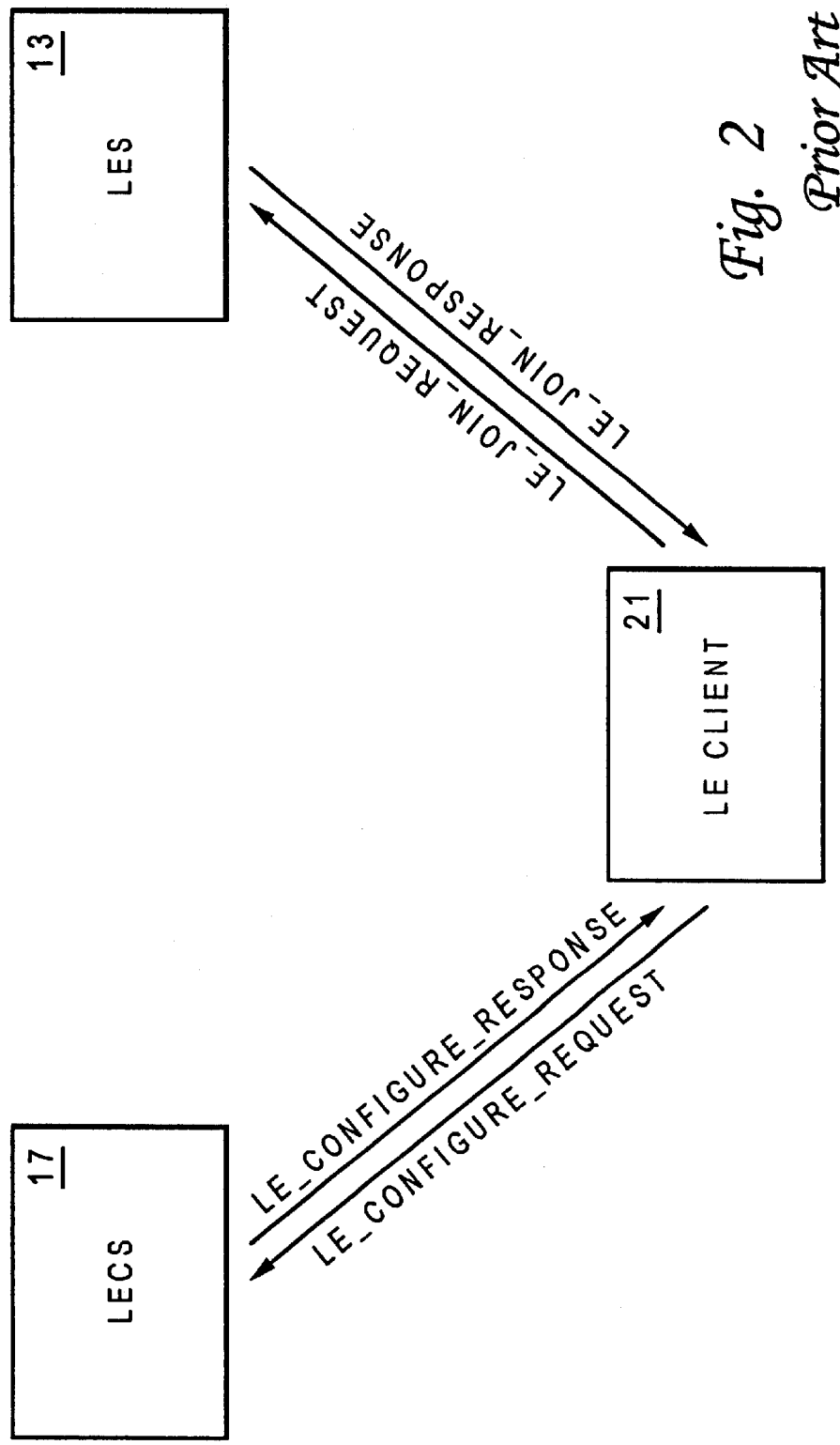
FIG. 2 is a block diagram of the operations involved in a join procedure by which a LAN emulated client becomes a member of an emulated LAN, according to the prior art.

With reference now to FIG. 2, there is illustrated a block diagram of the operations involved in a join procedure by which a LE client becomes a member of an emulated LAN 11, according to the prior art. After establishing a virtual control connection (VCC) to LECS 17, an LE client 21 sends a LE_CONFIGURE_REQUEST to LECS 17. LECS 17 then checks its databases and sends back a LE_CONFIGURE_RESPONSE to LE client 21 if LE client 21 is authorized to join emulated LAN 11 according to the policies established in the databases of LECS 17. This LE_CONFIGURE_RESPONSE includes an ATM address of a LES 13, which is associated with emulated LAN 11 that LE client 21 intends to join. The LE_CONFIGURE_RESPONSE may also include other various configuration parameters that are essential to LE client 21. However, if LE client 21 is not authorized to join emulated LAN 11, the LE_CONFIGURE_RESPONSE from LECS 17 will contain a negative status code. Afterwards, LE client 21 establishes another VCC to LES 13 by utilizing an ATM address provided in the LE_CONFIGURE_RESPONSE, and LE client 21 then sends a LE_JOIN_REQUEST to LES 13. In response, LES 13 sends an LE_JOIN_RESPONSE that includes a status indicating whether LE client 21 is allowed to join emulated LAN 11.

With the above-mentioned join procedure, LES 13 would not know whether or not LE client 21 should be allowed to join emulated LAN 11. One option is to assume that because LE client 21 has obtained the ATM address of LES 13, therefore LE client 21 must be authorized to join emulated LAN 11. Obviously, this option does not provide any security because any LE client that happens to know the ATM address of LES 13, by whatever means, can join emulated LAN 11. A second option is to replicate all the databases of LECS 17 in LES 13, which would allow LES 13 to independently authenticate any requesting LE client. However, this option requires additional resources and is administratively more burdensome. A third option, which is also the present invention, is to allow LES 13 to inquire of LECS 17 whether or not LE client 21 is authorized to join emulated LAN 11.

Figure 3:
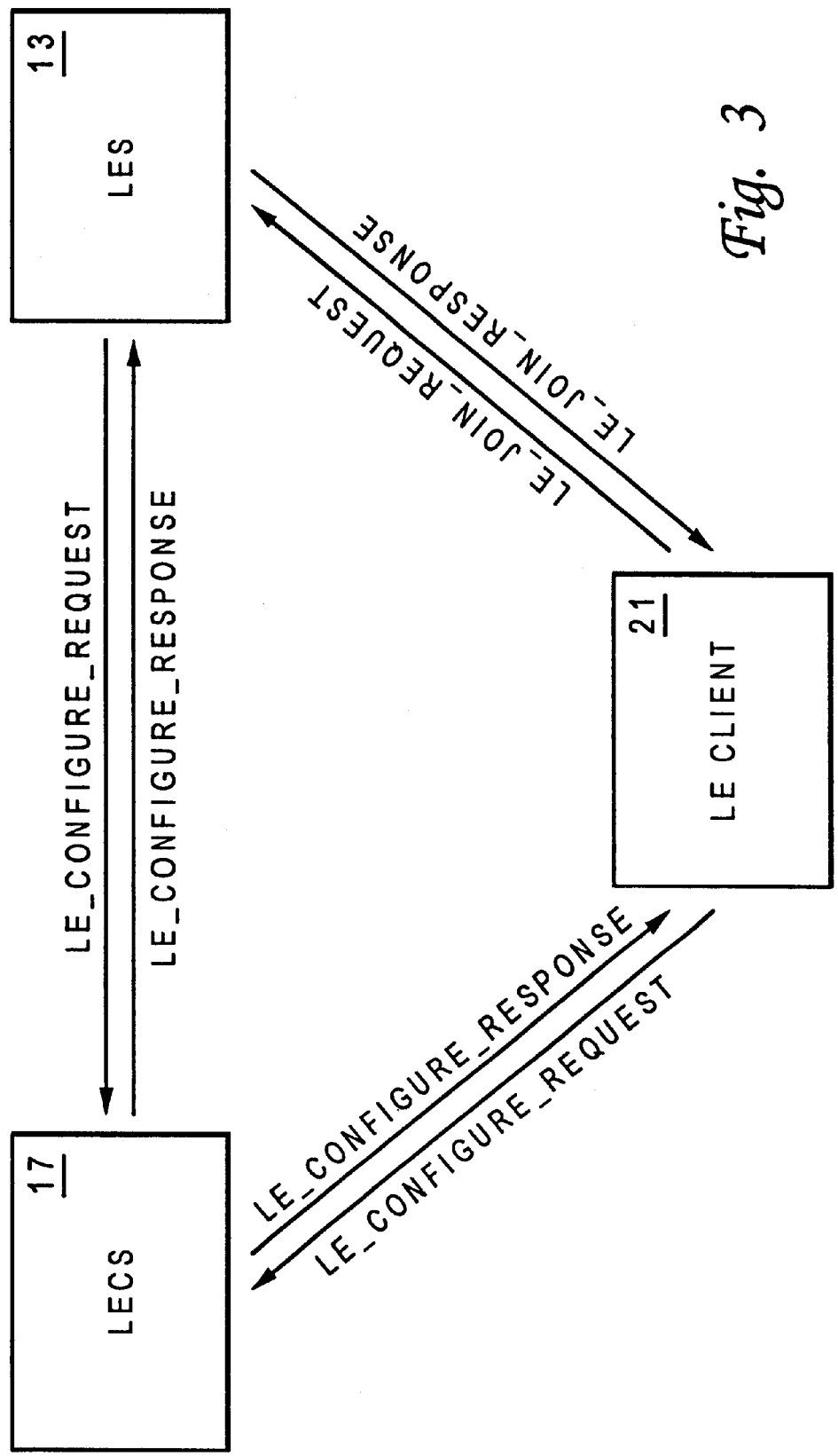
FIG. 3 is a block diagram of the operations involved in a join procedure by which a LAN emulated client becomes a member of an emulated LAN, in accordance with a preferred embodiment of the present invention.

Referring now to FIG. 3, there is illustrated a block diagram of the operations involved in a join procedure by which a LE client becomes a member of an emulated LAN, in accordance with a preferred embodiment of the present invention. After receiving a LE_JOIN_REQUEST from LE client 21, LES 13 transmits a query to LECS 17 with a LE_CONFIGURE_REQUEST on behalf of LE client 21, utilizing the information obtained from the LE_JOIN_REQUEST previously received from LE client 21. The LE_CONFIGURE_REQUEST is formed by LES 13 by copying the Source LAN Destination, Source ATM address, LAN Type, Maximum Frame Size, emulated LAN Name Size, and emulated LAN Name fields from the corresponding values in the LE_JOIN_REQUEST received from LE client 21. As a response, LECS 17 returns a LE_CONFIGURE_RESPONSE to LES 13 in a normal manner. This LE_CONFIGURE_RESPONSE preferably includes a Status field and a Target ATM Address field. If this LE_CONFIGURE_RESPONSE indicates a success status and contains an ATM address of LES 13 that matches the ATM address of the same LES to which LE client 21 is assigned, then LE client 21 is authorized to join emulated LAN 11, and LES 13 will then send back a LE_JOIN_RESPONSE with a success status to LE client 21. In other words, if the ATM address of LES 13 is X and the LE_CONFIGURE_RESPONSE from LECS 17 contains a success status and the Target ATM Address field contains X, then LES 13 will send a LE_JOIN_RESPONSE with a success status back to LE client 21. Otherwise, LES 13 will send back a LE_JOIN_RESPONSE with a failure status in order to inhibit LE client 21 from joining emulated LAN 11. This method protects against any LE client that skips the two steps of sending a LE_CONFIGURE_REQUEST to LECS 17 and waiting for a LE_CONFIGURE_RESPONSE from LECS 17, and is necessary because otherwise LES 13 has no way of determining whether these two steps have been performed by LE client 21 before sending a LE_JOIN_REQUEST to LES 13.

Figure 4:
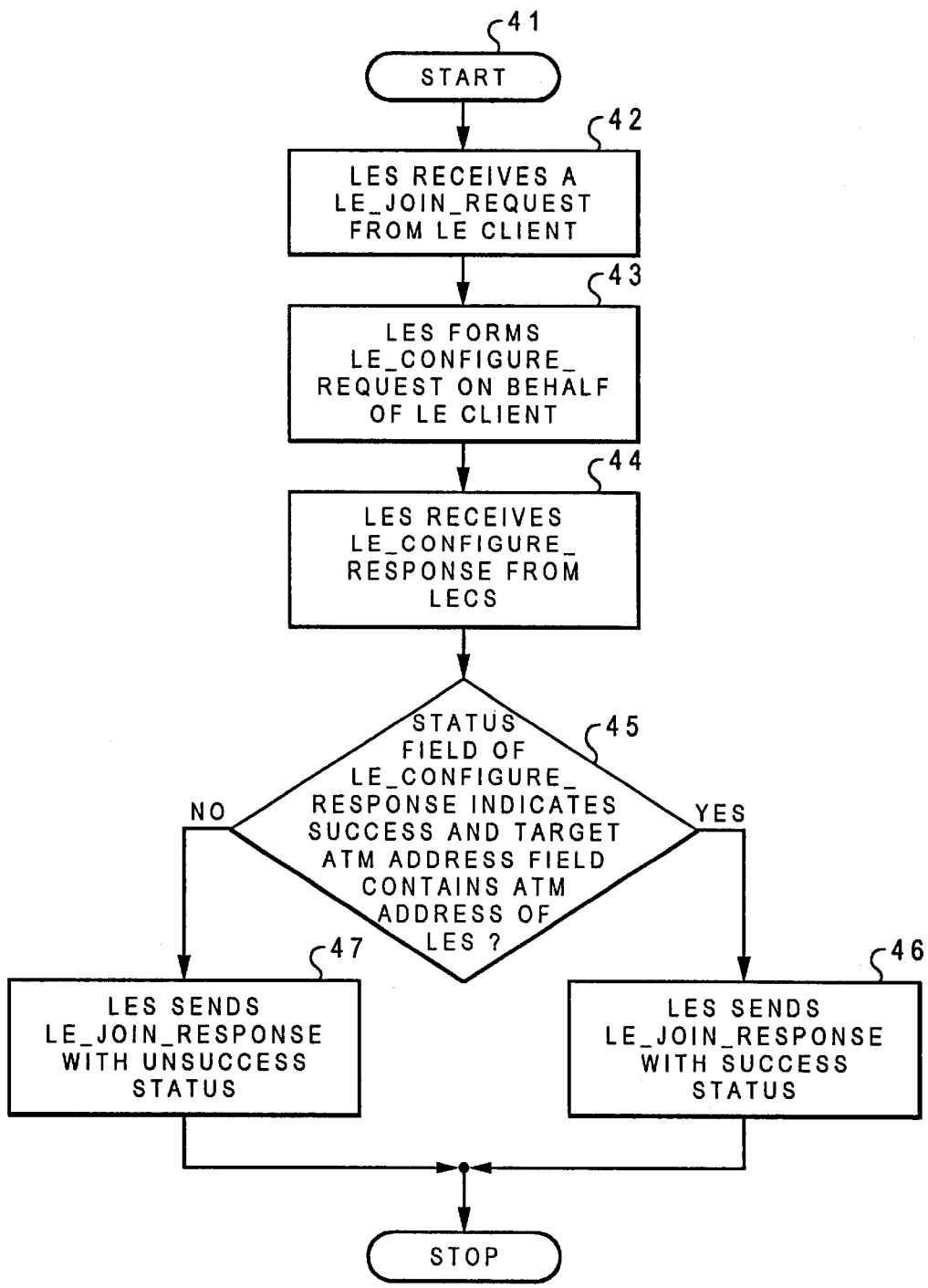
FIG. 4 is a high-level logic flow diagram of a method for providing a security mechanism to an emulated LAN, in accordance with a preferred embodiment of the present invention.

With reference now to FIG. 4, there is illustrated a high-level logic flow diagram of a method for providing a security mechanism to an emulated LAN, in accordance with a preferred embodiment of the present invention. Starting at block 41, a LES first receives a LE_JOIN_REQUEST from a LE client, as shown in block 42. By utilizing the information from the LE_JOIN_REQUEST, the LES then forms a LE_CONFIGURE_REQUEST on behalf of the LE client and sends the LE_CONFIGURE_REQUEST to a LECS, as depicted in block 43. After receiving a LE_CONFIGURE_RESPONSE from the LECS, as shown in block 44, a determination is made as to whether or not a Status field of the LE_CONFIGURE_RESPONSE indicates a success and a Target ATM Address field of the LE_CONFIGURE_RESPONSE contains the ATM address of the LES, as illustrated in block 45. If both conditions are met, the LES then sends a LE_JOIN_RESPONSE with a success status back to the LE client, thereby enabling the LE client to join the emulated LAN, as shown in block 46. However, if none or only one of the two conditions is met, the LES then sends a LE_JOIN_RESPONSE with a failure status back to the LE client such that the LE client is not allowed to join the emulated LAN, as depicted in block 47.

As has been described, the present invention provides an improved security mechanism to an ATM emulated LAN. It is important to note that although the present invention has been described in the context of a computer system within a network, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for providing a security mechanism to an Asynchronous Transfer Mode (ATM) emulated local-area network (LAN), wherein said ATM emulated LAN is served by a LAN Emulation Server (LES), a Broadcast and Unknown Server (BUS), and a LAN Emulation Configuration Server (LECS), said method comprising the steps of:

receiving a LE_JOIN_REQUEST from a LE client at a LES;

in response to the receipt of said LE_JOIN_REQUEST, sending a LE_CONFIGURE_REQUEST from said LES to a LECS utilizing information within said LE_JOIN_REQUEST;

receiving a LE_CONFIGURE_RESPONSE from said LECS at said LES;

determining whether or not said LE_CONFIGURE_RESPONSE indicates a success; and in response to a determination that said LE_CONFIGURE_RESPONSE indicates a success, sending a LE_JOIN_RESPONSE with a success status from said LES to said LE client, such that said LE client is allowed to join an ATM emulated LAN having said LES and said LECS.

2. The method according to claim 1, wherein said method further includes a step of forming a LE_CONFIGURE_REQUEST on behalf of said LE client at said LES.

3. The method according to claim 1, wherein said method further includes a step of sending a LE_JOIN_RESPONSE with a failure status from said LES to said LE client, in response to a determination that said LE_CONFIGURE_RESPONSE does not indicate a success.

4. The method according to claim 1, wherein said determining step further includes a step of determining whether or not a target ATM address field of said LE_CONFIGURE_RESPONSE contains an ATM address of said LES.

5. The method according to claim 4, wherein said method further includes a step of sending a LE_JOIN_RESPONSE with a failure status from said LES to said LE client in response to a determination that said target ATM address field at said LE_CONFIGURE_RESPONSE does not contain an ATM address of said LES.

6. A LAN Emulation Server (LES) for serving a Asynchronous Transfer Mode (ATM) emulated local-area network (LAN) having a security mechanism, wherein said ATM emulated LAN is also served by a Broadcast and Unknown Server (LES/BUS) and a LAN Emulation Configuration Server (LECS), said LES comprising:

means for receiving a LE_JOIN_REQUEST from a LE client;

means for sending a LE_CONFIGURE_REQUEST to a LECS utilizing information within said LE_JOIN_REQUEST, in response to the receipt of said LE_JOIN_REQUEST;

means for receiving a LE_CONFIGURE_RESPONSE from said LECS;

means for determining whether or not said LE_CONFIGURE_RESPONSE indicates a success; and means for sending a LE_JOIN_RESPONSE with a success status to said LE client, in response to a determination that said LE_CONFIGURE_RESPONSE indicates a success, such that said LE client is allowed to join an ATM emulated LAN having said LES and said LECS.

7. The LES according to claim 6, wherein said LES further includes a means for forming a LE_CONFIGURE_REQUEST on behalf of said LE client.

8. The LES according to claim 6, wherein said LES further includes a means for sending a LE_JOIN_RESPONSE with a failure status to said LE client, in response to a determination that said LE_CONFIGURE_RESPONSE does not indicate a success.

9. The LES according to claim 6, wherein said determining means further includes a means for determining whether or not a target ATM address field of said LE_CONFIGURE_RESPONSE contains an ATM address of said LES.

10. The LES according to claim 9, wherein said LES further includes a means for sending a LE_JOIN_RESPONSE with an status to said LE client in response to a determination that said target ATM address field of said LE_CONFIGURE_RESPONSE does not contain an ATM address of said LES.

11. A computer program product for providing a security mechanism to an Asynchronous Transfer Mode (ATM) emulated local-area network (LAN), wherein said ATM emulated LAN is served by a LAN Emulation Server (LES), a Broadcast and Unknown Server (BUS), and a LAN Emulation Configuration Server (LECS), said computer program product comprising:

program code means for receiving a LE_JOIN_REQUEST from a LE client at a LES;

program code means for sending a LE_CONFIGURE_REQUEST from said LES to a LECS utilizing information within said LE_JOIN_REQUEST, in response to the receipt of said LE_JOIN_REQUEST;

program code means for receiving a LE_CONFIGURE_RESPONSE from said LECS at said LES;

program code means for determining whether or not said LE_CONFIGURE_RESPONSE indicates a success; and program code means for sending a LE_JOIN_RESPONSE with a success status from said LES to said LE client, in response to a determination that said LE_CONFIGURE_RESPONSE indicates a success, such that said LE client is allowed to join an ATM emulated LAN having said LES and said LECS.

12. The computer program product according to claim 11, wherein said computer program product further includes a program code means for forming a LE_CONFIGURE_REQUEST on behalf of said LE client at said LES.

13. The computer program product according to claim 11, wherein said computer program product further includes a program code means for sending a LE_JOIN_RESPONSE with a failure status from said LES to said LE client, in response to a determination that said LE_CONFIGURE_RESPONSE does not indicate a success.

14. The computer program product according to claim 11, wherein said program code means for determining further includes a program code means for determining whether or not a target ATM address field of said LE_CONFIGURE_RESPONSE contains an ATM address of said LES.

15. The computer program product according to claim 14, wherein said computer program product further includes a program code means for sending a LE_JOIN_RESPONSE with a failure status from said LES to said LE client in response to a determination that said target ATM address field of said LE_CONFIGURE_RESPONSE does not contain an ATM address of said LES.

* * * * *